United States Patent [19]

Kitamura et al.

[11] 4,361,880

[45] Nov. 30, 1982

[54] PROGRAMMABLE AUTOMATIC RECORD PLAYER

[75] Inventors: Masatsugu Kitamura; Hideo Onoye; Tsuyoshi Ono; Fumiaki Ohno; Yukihiro Kishima; Yutaka Morita, all of Yokohama, Japan

[73] Assignee: Victor Company of Japan, Limited, Yokohama, Japan

[21] Appl. No.: 156,775

[22] Filed: Jun. 4, 1980

[30] Foreign Application Priority Data

Jun. 5, 1979 [JP] Japan .................................. 54-70939
Jun. 5, 1979 [JP] Japan .................................. 54-70940

[51] Int. Cl.³ ............................................ G11B 17/06
[52] U.S. Cl. ........................................ 369/33; 369/41; 369/56
[58] Field of Search ................ 369/30, 32, 33, 52, 369/53, 40, 122, 41, 55, 56, 57, 134

[56] References Cited

U.S. PATENT DOCUMENTS

| | | | |
|---|---|---|---|
| 3,689,079 | 9/1972 | Matsuda et al. | 369/33 |
| 3,830,505 | 8/1974 | Rabinow | 369/43 X |
| 4,079,944 | 3/1978 | Durley et al. | 369/56 |
| 4,132,935 | 1/1979 | Gaus et al. | 369/134 X |
| 4,184,687 | 1/1980 | Wren et al. | 369/33 |
| 4,202,549 | 5/1980 | Takeuchi | 369/33 |
| 4,230,323 | 10/1980 | Tsuji et al. | 369/52 X |
| 4,260,162 | 4/1981 | Morii et al. | 369/33 |
| 4,301,526 | 11/1981 | Morii et al. | 369/33 |

*Primary Examiner*—Bernard Konick
*Assistant Examiner*—Donald McElheny, Jr.
*Attorney, Agent, or Firm*—Lowe, King, Price & Becker

[57] ABSTRACT

A pickup arm is equipped with a photo sensor assembly for detecting non-recorded portions on a disk. The sensor is located in such a position that horizontal distance between the stylus tip and the detecting point of the sensor measured in the direction of the radius of the turntable is substantially constant throughout the possible rotational angle of the arm. The rotational angle of the arm is measured and is modified by a given angle corresponding to the above mentioned distance. When this distance deviates from a standard value on replacement of the same with another, the variation may be readily corrected by manipulating a potentiometer. Prior to performing an automatic playback, the disk is scanned by the sensor and signals indicative of the arm angles corresponding to the non-recorded portions are stored. After scanning, the arm is controlled by comparing the actual angle of the arm with the prestored angles, to place the stylus on a right position on the disk to perform automatic playback in accordance with programmed information.

20 Claims, 8 Drawing Figures

PROGRAMMABLE AUTOMATIC RECORD PLAYER

FIELD OF THE INVENTION

This invention generally relates to an automatic disk record player, and more particularly it relates to such a record player having a programming function for selectively reproducing desired pieces of information such as music from a disk.

BACKGROUND OF THE INVENTION

As is well known, when a phonograph disk contains a number of pieces of music on the same side thereof, two of consecutive pieces are separated from each other by a coarse groove portion, which will be referred to as a separation band, at which no information has been prerecorded. These separation bands are provided not only for providing a short interval between pieces of music but also for making it easy to place the stylus of the phonograph cartridge or pickup so that a specific piece of music may be selectively played back. However, in order to succeed in such selection and positioning of the stylus onto a separation band just prior to a desired piece of music the user or operator of the record player has to be skilled. Namely, since the separation band has a relatively narrow width, the stylus might be positioned onto a wrong position, i.e. a fine-groove portion, when the pickup arm is manipulated manually, and furthermore, there is a possibility that the stylus and/or the record grooves might be damaged.

Recently, new programmable automatic record players have been developed to remove the above mentioned inconveniences. Namely, according to these known players the pickup arm is automatically fed in accordance with a command signal produced in view of the pickup arm position detected by means of a photo sensor so that pieces of music, which have been programmed, will be reproduced in a sequence. However, the photo sensor for detecting the position of the arm is incorporated in or built in the pickup shell or casing. Therefore, it is impossible to replace such a pickup with a desired pickup. Furthermore, the above-mentioned known automatic record players are not equipped with a memory for storing distances between the separation bands, and therefore, when a plurality of programmed pieces of music are reproduced, in a sequence the pickup arm has to be returned to the circumferential portion of the disk each time prior to selecting the next piece. Since the pickup arm returns to the outer portion of the disk each time on selection of a piece of music, prior to a right positioning of the arm onto a programmed separation band, namely the pickup arm moves back and forth, it consumes time. In other words, a relatively long access time is required in the known programmable automatic record player.

SUMMARY OF THE INVENTION

The present invention has been developed in order to remove the above mentioned disadvantages and drawbacks inherent to the conventional programmable automatic record player.

It is, therefore, a primary object of the present invention to provide a programmable automatic record player having a replaceable pickup.

Another object of the present invention is to provide such a programmable automatic record player in which selection of pieces of recorded information may be performed within a short period of time.

A further object of the present invention is to provide such a programmable automatic record player in which the stylus connected to the pickup is positioned correctly on a desired position on a phonograph disk.

In the programmable automatic record player according to the present invention, the movement of the pickup arm is automatically controlled by two motors, i.e. vertical position and horizontal position control motors, so that the vertical and horizontal positions or angles of the arm are controlled as desired. The arm is equipped with an arm angle detector, which will be referred to as an arm angle encoder, so that the horizontal angle of the arm is detected, while the arm is further equipped with a photo sensor assembly which detects the pressure of a disk on the turntable, and the separation bands on which no information has been prerecorded.

An electronic control means, such as a microcomputer is provided to control the above mentioned two motors as well as a turntable drive motor. The microcomputer includes a random access memory (RAM) for storing various information given through a keyboard. The operator of the record player can manipulate the keyboard to select and program a plurality of pieces of music which he or she wants to listen to, and to start and stop the operation of the record player.

When at least one piece of music or other information prerecorded on a disk on the turntable is programmed, the arm is automatically raised from the arm rest and then the arm is rotated horizontally toward the center of the turntable. The photo sensor assembly emits a light beam downwardly and the reflecting beam is received by a photo sensitive element incorporated therein. The photo sensor assembly is disposed in the vicinity of the stylus and is arranged to have the same locus as the stylus on the turntable as the arm is horizontally rotated. Accordingly, the photo sensor assembly scans the surface of the disk, detecting the size of the disk record and the separation bands including the outer edge portion of the disk. Each time the photo sensor assembly detects a separation band, the horizontal angle of the arm is detected and is stored in a sequence in the RAM. Simultaneously, the rotational angle of the turntable is detected to be stored in the same manner. The scanning is completed when the arm has been rotated to a predetermined possible maximum angle. Then the arm is returned to the arm rest if immediate playback is not requested.

On the other hand, if the operator wishes to immediately listen to music, which he or she has selected and programmed, the arm is rotated in the reverse direction from the inner most portion of the disk to place the stylus on the correct separation band which is located just before a piece of music to be played back first. The horizontal angle of the arm is detected when backwardly rotating the arm and this detected angle is compared with a prestored angle corresponding to the aimed separation band. When these two angles equal each other the arm is lowered to place the stylus on the separation band. The stylus pressure may be suitably adjusted by controlling the driving current applied to the vertical position control motor. The remaining programmed pieces of music will be played back in the same manner by raising the arm, rotating the arm to place the stylus on a right position and then lower the arm.

In order to accurately place the stylus on the right position irrespectively of the eccentricity of the disk, the lowering speed of the arm is controlled such that the stylus abuts on the disk surface when the rotational angle of the turntable equals a corresponding angle prestored in the RAM, which angle has been obtained on the above mentioned scanning.

A display is connected to the control means for visually displaying various information, such as the numbers of programmed pieces of music, a specific number of a piece of music on play, the number of a piece of music to be played back next, the stylus pressure and the like. A muting switch is provided to block noises which occur when the stylus abuts on the surface of the disk.

The above mentioned photo sensor assembly is connected to the arm and is spaced from the stylus of the pickup by a given distance in the direction substantially perpendicular to the arm. Therefore, when the photo sensor assembly detects one of the separation bands of the disk, the horizontal arm angle indicated by the output signal of the above-mentioned arm angle encoder differs from the angle which will be made by the arm when the stylus is above the separation band. However, since the photo sensor assembly is attached to the arm in such a position that the horizontal distance between the stylus tip and the detecting point of the photo sensor assembly measured in the direction of radius of the turntable is constant throughout the possible rotational angle of the arm, the difference in angle can be readily corrected by adding a given angle to a measured angle. A stylus position correction circuit is employed to produce a signal indicative of the difference in distance between the stylus tip and the detecting point of the photo sensor assembly.

When the pickup is replaced with another, the distance between the stylus tip and the detecting point is apt to deviate from the originally set distance. In this case, the above mentioned stylus position correction circuit may be manipulated to produce its output signal indicative of the actual distance which may be visually measured. The output signal of the stylus position correction circuit will be used to modify the measured angle of the arm so that this modified angle is stored in the RAM.

BRIEF DESCRIPTION OF THE DRAWINGS

These and other objects and features will be more readily apparent from the following detailed description of the preferred embodiment taken in conjunction with the accompanying drawings in which.

DETAILED DESCRIPTION OF THE PREFERRED EMBODIMENT

Figure 1:
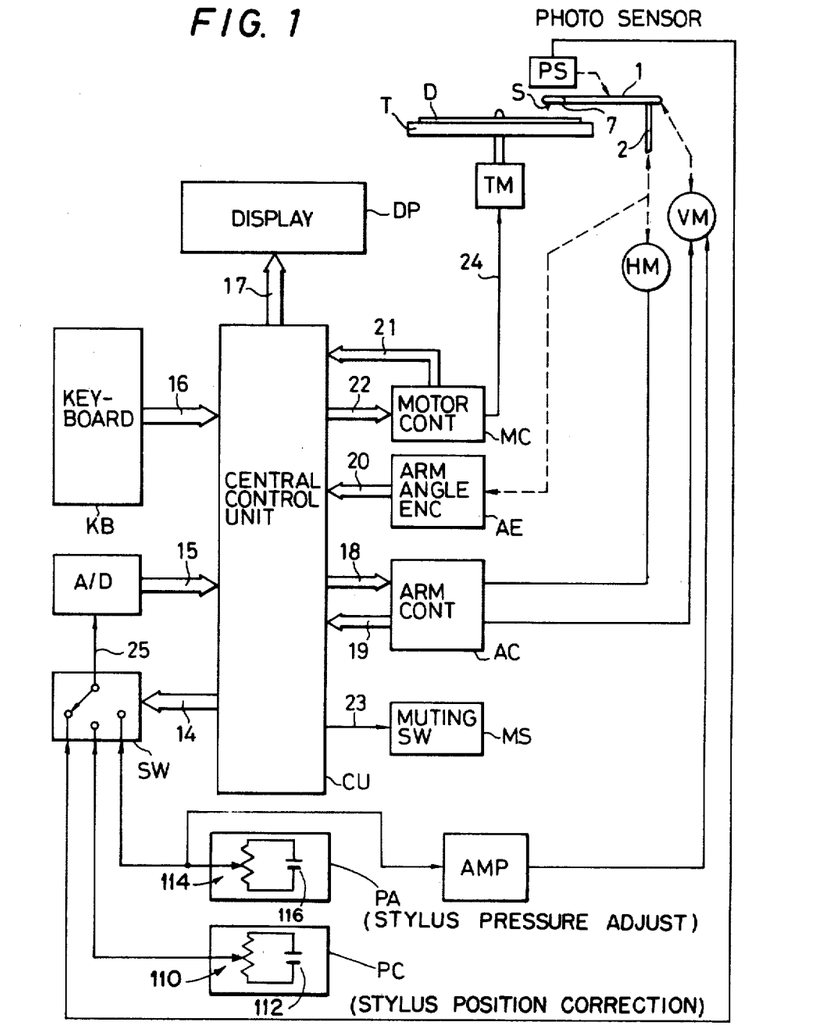
FIG. 1 is a schematic block diagram of an embodiment of the programmable automatic record player according to the present invention.

FIG. 1 is a schematic block diagram of an embodiment of the programmable automatic record player according to the present invention. The record player comprises a pickup arm 1, which is pivotally mounted on the player body (not shown) via a shaft 2, a cartridge or pickup 7 disposed at the front end portion of the pickup arm 1, a turntable T rotatably mounted on the body of the player. The pickup arm 1 is operatively coupled to a vertical position control motor VM, while the shaft 2 is operatively coupled to a horizontal position control motor HM so that the vertical and horizontal positions or angles of the pickup arm 1 will be determined by the driving currents applied to these motors VM and HM. The turntable T is driven by a turntable drive motor TM in the same manner as in a conventional player.

The above mentioned three motors VM, HM and TM are respectively controlled by electrical driving currents applied from electronic circuits which will be described in detail hereunder.

A photo sensor assembly PS, the construction of which will be described in detail hereinlater, is mechanically coupled to the pickup arm 1, for detecting the position of the stylus S of the pickup 7 with respect to the disk D.

The above mentioned electronic control circuits are constructed of a central control unit CU, which may be a microcomputer, a stylus position correction circuit PC, a stylus pressure adjusting circuit PA, an amplifier AMP, a switching circuit SW, an analog to digital converter A/D, a keyboard KB, a display DP, a turntable drive motor control circuit MC, an arm angle encoder AE, an arm control circuit AC, and a muting switch MS.

The arm control circuit AC is connected to the central control unit CU for receiving command signals and for supplying the central control unit CU with information in connection with the vertical and horizontal positions or angles of the arm 1. Namely, the arm control circuit AC produces first and second driving currents respectively applied to the vertical position control motor VM and to the horizontal position control motor HM in accordance with the command signals applied from the central control unit CU via a group of transmission lines so that the vertical and horizontal angles of the arm 1 will be controlled in accordance with the commands from the central control unit CU. Meanwhile, the driving currents respectively applied to these two motors VM and HM are detected so that information or data of the vertical and horizontal angles of the arm 1 will be applied to the central control unit CU via a group of transmission lines 19. Structures useful for the arm control circuit AC are known as illustrated, for example, by UK Patent Application GB Ser. No. 200,895, published in January, 1979, and pages 170 through 175 of the December, 1978, issue of Audio People. Accordingly, a detailed description of the structure of the circuit AC is omitted.

The arm angle encoder AE produces an output signal indicative of the horizontal rotational angle of the arm 1. The arm angle encoder AE is mechanically connected to the shaft 2 of the arm 1 as indicated by a dotted line in FIG. 1, and the detailed construction will be described later with reference to FIG. 2. The output signal of the arm angle encoder AE is applied to the central control unit CU via transmission lines 20. Transmission lines, which are shown in the form of wide arrowed lines in FIG. 1, are actually constructed of a plurality of wires so that a digital signal may be transmitted through the same.

The turntable motor control circuit MC receives a command signal applied via transmission lines 22 from the central control unit CU for producing a turntable drive current which is applied to the turntable drive motor TM in turn. The motor control circuit MC also produces an output signal indicative of the rotational angle of the turntable T, and this signal is fed via transmission lines 21 to the central control unit CU. Structures usable for the turntable motor control circuit MC are known, and illustrated, for example, by pages 106 through 107 of the December, 1973, publication in Denpa Kagaku. Accordingly, a detailed description of the structure of the circuit MC is omitted.

The keyboard KB including a matrix is coupled via transmission lines 16 to the central control unit CU for effecting programming and operations of the pickup arm 1 as well as the turntable T in accordance with the programmed sequence. The display DP is coupled via transmission lines 17 to the central control unit CU for displaying various information such as numbers of pieces of music selected and programmed.

Figure 3:
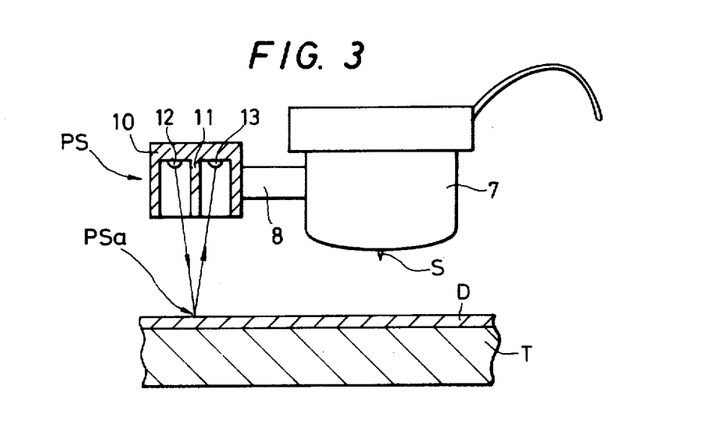
FIG. 3 shows the relationship between the pickup and the photo sensor assembly connected to the pickup arm, and the relationship between these elements and the phonograph disk all shown in FIG. 1.

The stylus position correction circuit PC produces an analog signal indicative of the amount to be corrected relating to the distance between the stylus S and the photo sensor assembly PS. Since the photo sensor assembly PS is mechanically coupled to the arm 1 and is spaced from the stylus S in the direction perpendicular to the arm 1 as shown in FIG. 3, the distance therebetween has to be ascertained and then this distance has to be applied to the central control unit CU for determining the instant that the arm 1 is lowered to place the stylus S at a desired point on the phonograph disk D. The stylus position correction circuit PC comprises a potentiometer 110 connected across a predetermined voltage source 112. The movable contact of the potentiometer may be manipulated for effecting fine adjustment which will be needed when the distance between the stylus S and the photo sensor assembly PS deviates from a predetermined distance. This distance is apt to deviate from a predetermined value when the pickup 7 is replaced with another or when only the stylus assembly is replaced with another. Therefore, when the actual distance between the stylus S and the photo sensor assembly PS is changed from the standard distance, the user of the record player finds out the amount of deviation and then he or she manipulates the movable contact of the potentiometer to produce a voltage either higher or lower than the standard voltage which corresponds to the standard distance. With this operation the voltage from the stylus position correction circuit PC is able to correctly indicate the actual distance between the stylus S and the photo sensor assembly PS irrespectively of the replacement of the pickup 7 or the stylus assembly.

The stylus pressure adjusting circuit PA also produces an analog signal indicative of a desired stylus pressure, and comprises a second potentiometer 114 connected across a predetermined voltage source 116. The movable contact of the second potentiometer may be manipulated by the user of the record player to adjust the stylus pressure, and the output signal of the stylus pressure adjusting circuit PA is applied via an amplifier AMP to the vertical position control motor VM. Since the vertical position control motor VM is further controlled by the output signal of the amplifier AMP, desired pressure will be applied to the stylus S.

The output signals of the above mentioned stylus position correction circuit PC, the stylus pressurs adjusting circuit PA, and the photo sensor assembly PS are respectively applied to the switching circuit SW, the switching function of which is controlled by a signal applied from the central control unit CU via transmission lines 14. The switching circuit SW selects one of the above mentioned three signals in accordance with the signal from the central control unit CU to feed the selected signal to the analog to digital converter A/D. The input signal of the analog to digital converter A/D is converted into a digital signal and then applied via transmission lines 15 to the central control unit CU.

The muting switch MS, which may be an ON-OFF switch, is interposed between the output terminal or terminals of the pickup 7 and ground. The operation of the muting switch MS is controlled by a signal applied via a transmission line 23 from the central control unit CU so that the output signal of the pickup 7 will be grounded for a short period of time on placement of the stylus S on the phonograph disk D. With this arrangement, noises, which, may be picked up when the stylus S is placed on the disk surface, will be blocked. As a result, such noises will not be monitored.

The central control unit CU comprises a microprocessor, a random access memory (RAM), read only memory (ROM), and the like in this embodiment, for example, the F8/One Card Micro-Computer-1, manufactured by Fairchild Company, Ltd. may be used as the central control unit CU. The operation of the central control unit CU is controlled by the above mentioned information and data supplied from the above mentioned various circuits. The keyboard, therefore, is operated by the user to control the central control unit, and therefore the record player. For instance, command signals indicative of PLAY, STOP, the order of music pieces to be played may be produced in the keyboard.

Figure 2:
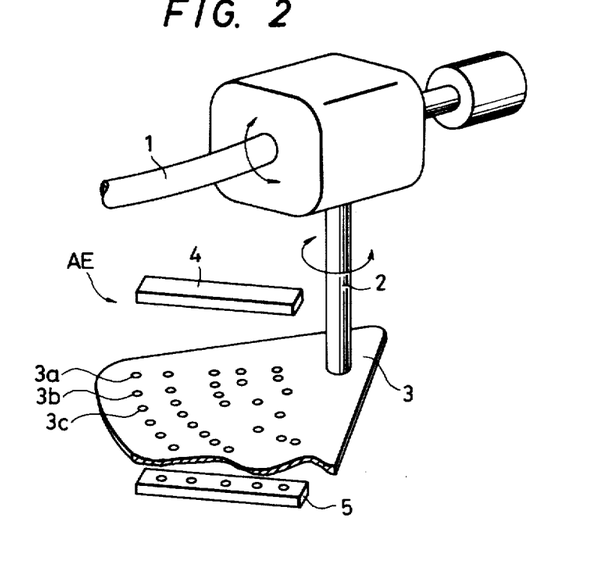
FIG. 2 is a schematic perspective view of the arm angle encoder connected to the pickup arm both shown in FIG. 1.

Reference is now made to FIG. 2 which shows the relationship between the arm angle encoder AE and the pickup arm 1. The arm angle encoder AE comprises a plate 3 fixedly connected to the arm shaft 2, a series of light sources 4, and a series of photo sensitive elements 5. The plate 3 is arranged to be substantially perpendicular to the shaft 2 and thus rotates as the shaft 2 rotates. Namely, the plate 3 rotates to the horizontal movement of the pickup arm 1. A number of through-holes are made in the plate 3, and these through-holes are aligned in lines radially with respect to the axis of the rotation, which corresponds to the center of the arm shaft 2. The through-holes in each row 3a, 3b, 3c . . . are coded so that the number and/or the position of the through-holes in each row differ from those of different rows. The maximum number of the through-holes made in one row equals the number of light sources 4 and therefore, the number of the photo sensitive elements 5. The series of the light sources 4 and the series of the photo sensitive elements 5 are arranged such that the plate 3 is interposed therebetween so that the light beams from the light sources 4 are received by the photo sensitive elements 5 only when corresponding through-holes exist therebetween. The output signals of the photo sensitive elements 5 are detected by level detectors (not shown) for producing a coded digital signal corresponding to the coded through-holes just between the light sources 4 and the photo sensitive elements 5. Accordingly, the digital signal from the level detectors indicates a specific horizontal rotational angle of the pickup arm 1. This signal will be used when determining the right position or angle of the arm 1 on placement of the stylus S onto the surface of the disk D as will be described in detail hereinlater.

FIG. 3 shows the relationship between the pickup 7 and the photo sensor assembly PS, and the relationship between these members and the disk D on the turntable T. The photo sensor assembly PS is supported by a member 8 which is fixedly connected to the arm 1 at its one end, the photo sensor assembly PS is positioned left side of the pickup 7 when viewed from the front end portion of the pickup 7. In other words, the photo sensor assembly PS is located inside the pickup 7 in the radial direction of the disk D or turntable T. The photo sensor assembly PS comprises a casing 10 having first and second recesses, a light source 12, and a photo sensitive element 13. The light source 12 and the photo sensitive element 13 are respectively disposed in the above mentioned first and second recesses, facing downwardly for emitting a light beam and for receiving a reflected beam. In FIG. 3, a light beam from the light source 12 is shown to be reflected at a point PSa on the surface of the disk D to be received by the photo sensitive element 13. The light source 12 and the photo sensitive element 13 are isolated by a shielding plate 11 so that direct transmission of the light beam to the photo sensitive element 13 is prevented.

Figure 4A:
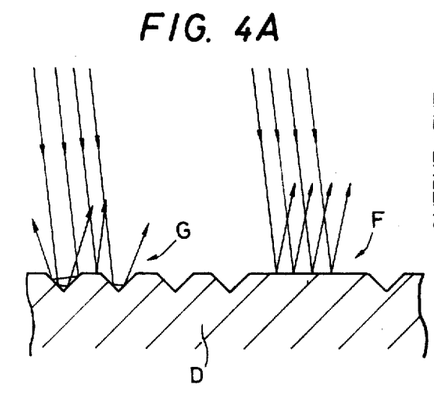
FIG. 4A is a cross-sectional view of the phonograph disk shown in FIG. 1 and FIG. 4, and the propagation line of the light beam from the photo sensor assembly are shown to be reflected at the surface of the disk.

FIG. 4A shows the difference between the result of light beam reflection at a fine groove portion G and the result of light beam reflection at a flat or coarse groove portion F, which corresponds to the outer edge portion, the aforementioned separation bands, or the inside or center portion of the disk record D. The intensity of the beam reflected at a flat or coarse groove portion F is much greater than that of the beam reflected at the fine groove portion G since irregular reflection occurs at such a fine groove portion G. By detecting this difference, it is possible to ascertain whether the photo sensor assembly PS is scanning the fine groove portion G or the flat or coarse groove portion F.

Figure 4B:
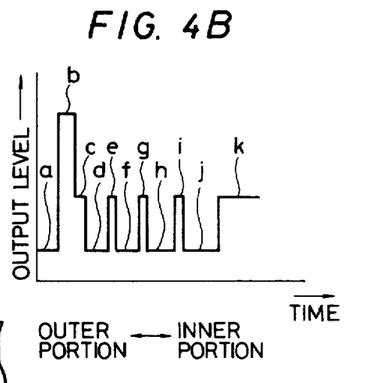
FIG. 4B is a level diagram showing the output signal levels of the photo sensor assembly.

FIG. 4B is a level diagram of the output signal of the photo sensor assembly PS, that is the output signal of the photo sensitive element 13 of FIG. 3. In this diagram, a portion indicated by a reference "a" corresponds to the output level of the photo sensor assembly PS when the reflecting or detecting point PSa is between the arm rest (not shown) and the periphery of the turntable T; "b" corresponds to the output level of the same when the point PSa is on the turntable T; "c" corresponds to the output level of the same when the point PSa is on the outer edge portion (nonrecorded portion) of the disk D; "d", "f", "h" and "j" correspond to the output level of the same when the point PSa is on the fine groove portion G (recorded portion); "e", "g" and "i" correspond to the output level of the same when the point PSa is on the separation bands (nonrecorded portion); and "k" corresponds to the output level of the same when the point PSa is on the inside or center portion (nonrecorded portion) of the disk D. It will be seen in this diagram of FIG. 4B that the output level "b" obtained from the reflection at the turntable T is much greater than the output level "c" obtained from the reflection at the outer edge portion of the disk D. Consequently, the periphery of the disk D is readily distinguished from the turntable T so that the diameter of the disk D placed on the turntable T is readily ascertained as will be described hereinlater. In order to make such a discrimination it is necessary that the reflection coefficient of the turntable surface be made different from that of the outer edge portion of the disk D. Furthermore, it is preferable that the reflection coefficient of the turntable surface be made higher than that of the outer edge portion of the disk D, as in the example of FIG. 4B, in order to ensure the detection irrespectively of influences due to external light.

Turning back to FIG. 3, let us remember that the horizontal distance between the photo sensor assembly PS, particularly the reflecting point PSa, and the stylus tip is fixed. However, since the locus of the stylus tip and the locus of the reflecting point PSa, both obtained when the arm 1 rotates, take the form of circular arcs, the fact that the horizontal distance between the reflecting point PSa and the stylus tip is fixed does not necessarily mean that the distance measured along the radius of the turntable T is constant throughout the possible rotational angle of the arm 1. The inventors of the present invention have found that this distance measured along the radius of the turntable T is substantially constant throughout the possible rotational angle of the arm 1 if the photo sensor assembly PS is disposed in such position that the locus of the reflecting point PSa agrees with the locus of the stylus tip. This point will be geometrically proved hereunder with reference to FIG. 5.

Figure 5:
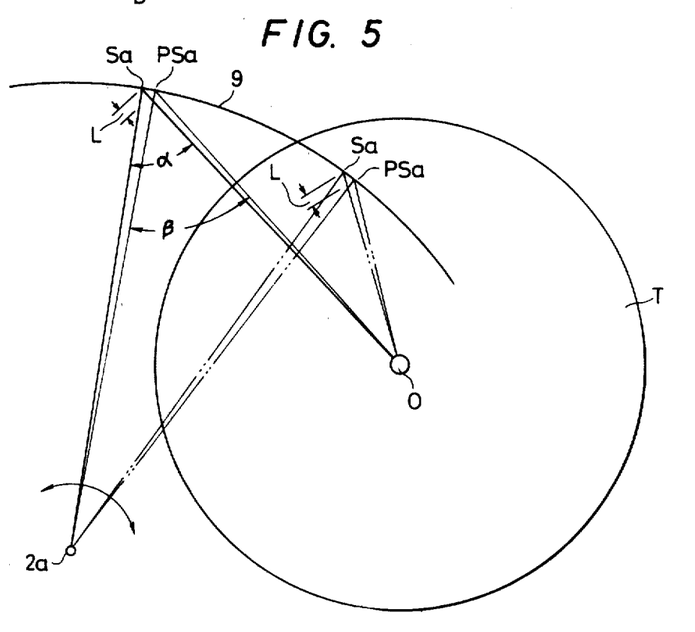
FIG. 5 is a geometrical illustration of the top view of the turntable and the locuses of the stylus tip and the reflecting point of the beam from the photo sensor assembly.

FIG. 5 is a geometrical illustration of the top view of the turntable T and the above mentioned loci of the stylus tip and the reflecting point PSa of the photo sensor assembly PS.

In FIG. 5, a reference 2a indicates the center of the rotation of the pickup arm 1; a reference O indicates the center of the rotation of the turntable T; a reference Sa indicates the position of the stylus tip; a reference PSa indicates the position of the reflecting point; and a numeral 9 indicates the loci of the stylus tip position Sa and the reflecting point PSa which are obtained when the arm 1 rotates horizontally. The horizontal distance d1 between the center point 2a and the stylus tip position Sa always equals the horizontal distance d2 between the center point 2a and the reflecting point position PSa, while the horizontal distance d3 between the stylus tip position Sa and the reflecting point position PSa is constant throughout the loci 9. Let $\alpha$, $\beta$, be the angles defined respectively by the points 2a, Sa and O, and by the points 2a, PSa and O. These angles $\alpha$ and $\beta$ are substantially equal to each other, and the variation of each of these angles $\alpha$ and $\beta$, which occurs as the arm 1 rotates, is negligibly small. Accordingly, the difference L between the distance $\overline{O\,Sa}$ between the turntable center O and the tip position Sa of the stylus S and the distance $\overline{O\,PSa}$ between the turntable center O and the reflecting point position PSa is substantially constant even though the arm 1 rotates. Namely, $L = (\overline{O\,Sa}) - (\overline{O\,PSa})$. This difference L in distance is that measured along the radius of the turntable T, and therefore, it can be said that the horizontal distance measured along the radius of the turntable T, and therefore the disk D, between the stylus tip and the reflecting point PSa of the photo sensor assembly PS is proved to be substantially constant throughout the possible rotational angle of the arm 1.

The operation of the programmable automatic record player according to the present invention will be described in detail with reference to the block diagram of FIG. 1 and flow charts of FIG. 6 and FIG. 7.

A step 24 indicates the START of the operational sequence of the central control unit CU, which may be a microcomputer. Namely, when the power switch (not shown) of the programmable automatic record player is turned on, the central control unit CU becomes operable, and then the operator or user of the record player manipulates the keyboard KB to enter necessary information, such as predetermined pieces of music to be played in a sequence. In a following step 26, the central control unit CU reads the information or data from the keyboard KB, and detects what kind of commands have been given.

In the case that the command from the keyboard KB is to program predetermined pieces of music, a following step 28 takes place to store the output signals of the keyboard KB indicative of the predetermined pieces of music, in the selected order. Such information of pieces of music selected will be displayed at the display DP so that the user can ascertain what has been selected.

In case the command from the keyboard KB is to stop the operation of the record player, a step 30 takes place to return the pickup arm 1 to the arm rest and to cancel programmed information if any. Namely, the arm control circuit AC receives such a command to produce driving currents with which the vertical position control motor VM and the horizontal position control motor HM are controlled to raise the arm 1 and then to horizontally rotate the arm 1 toward the arm rest. As the arm 1 reaches a position above the arm rest, the arm 1 is lowered to be placed on the arm rest.

In case that the command from the keyboard KB is to play pieces of music preprogrammed, a step 40 takes place. As described in the summary of the invention, the disk D on the turntable T is scanned by the photo sensor assembly PS to obtain and store necessary angle information for each separation band on the disk D. This scanning will be made prior to reproducing the programmed pieces of music as will be described in detail hereunder.

Namely, the arm control circuit AC controls the vertical position control motor VM and the horizontal position control motor HM to raise the arm 1 from the arm rest and then to horizontally rotate it toward the center of the turntable T.

This arm control circuit AC comprises a driving circuit which produces two driving currents respectively applied to these two motors VM and HM, and a detecting circuit which detects the situation of the arm 1. In detail, the increase in each of driving currents is detected to see whether the arm 1 has reached a stopper which is arranged to abut against the arm 1 when the arm 1 is raised vertically; to see whether the arm 1 has reached a second stopper which is arranged to abut against the arm 1 when the arm 1 is horizontally rotated toward the center of the turntable T excessively; and to see whether the stylus S is placed on the surface of the disk record D. The detected data are applied via the transmission lines 19 to the central control unit CU so that the central control unit CU is capable of supplying the arm control circuit AC with control signals by which the driving currents are controlled to raise, lower, horizontally rotate in both directions, support and stop the arm 1. This means that the pickup arm 1 can be freely controlled in accordance with various commands applied from the keyboard KB. The driving current of the vertical position control motor VM can be further controlled in accordance with the output signal of the amplifier AMP to adjust the stylus pressure, as will be described hereinlater, when the stylus S is placed on the surface of the disk D.

After the step 40, it is detected whether a disk is on the turntable T in a step 50. In this step 50, not only the presence of a disk but also the size, i.e. the diameter, of the disk, such as 30, 25 or 17 cm, if a disk on the turntable T is detected, is detected. If the answer of this step 50 is NO, namely, if no disk is detected, the program sequence enters into the aforementioned step 30. On the other hand, if the presence of a disk is ascertained, a following step 60 takes place in which it is detected whether there are any programmed pieces of music.

If the answer of this step 60 is YES, i.e. when at least one piece of music has been programmed to be played back, a following step 70 takes place to detect separation bands by the photo sensor assembly PS. On the contrary, if the answer of this step 60 is NO, the step 70 is skipped to enter into the next step 80 so that the arm 1 will be returned to the arm rest.

Prior to describing the step 80 which follows the above mentioned step 60 or 70 depending on the answer of the step 60, the step 50, in which the presence of the disk is detected, will be further described in detail with reference to FIG. 7. FIG. 7 is a flow chart showing detailed steps actually contained in the step 50.

In the first step, which is designated as 52, of the step 50, the central control unit CU reads data from the angle encoder AE. Namely, the horizontal angle of the arm 1 is detected. In the following step 53, it is detected whether the arm angle is the maximum in the possible rotational angle of the same. Namely, it is detected whether the arm 1 is located in the inner most position with respect to the turntable T. If the horizontal rotational angle of the arm 1 is the maximum, the answer of the step 53 is YES detecting no disk on the turntable T. In this case playback cannot be performed and thus the arm 1 will be returned to the arm rest by the step 30. When a disk is detected by ascertaining that the arm horizontal angle is smaller than the maximum, the output signal of the photo sensor assembly PS is stored in a memory through the switching circuit SW and the analog to digital converter A/D. In order that the output signal of the photo sensor assembly PS is stored in the memory, such as the aforementioned RAM, the switching circuit SM is so controlled by a switching control signal from the central control unit CU to transmit the output signal to the analog to digital converter A/D.

In the following step 55, the level of the output signal of the photo sensor assembly PS is compared with the maximum level of the same which has been stored in the past. If the level of the incoming signal from the photo sensor assembly PS has a predetermined relationship, such as half of the maximum value, the photo sensor assembly PS can be regarded as having passed through the periphery or the circumferential edge portion of the disk D. In this case the answer of the step 55 becomes YES and a following step 56 takes place to detect the size or diameter of the disk D. Namely, when the answer of the step 55 is YES, the horizontal rotational angle of the arm 1, which is indicated by the arm angle encoder AE, is compared with prestored values indicative of different sizes of disks so that the size of the disk D on the turn-table T is determined. If the answer of the step 55 is NO, the program sequence returns to the first step 52. After the disk record size is detected in the step 56, the program enters into the step 60 of FIG. 6 as described hereinabove.

The horizontally rotating speed of the arm 1 is controlled in such a manner that the period of time required for performing the operations of steps from 52 to 56 is shorter than the interval between two consecutive output coded signals from the arm angle encoder AE. Accordingly, a high accuracy in the periphery detection is obtained.

Turning back to FIG. 6, let us remember that separation bands in the disk D are detected in the step 70. The step 70 actually comprises a plurality of steps similar to the steps 52 to 55 included in the step 50. Namely, the arm angles indicated by the output signals of the arm angle encoder AE are stored in the RAM when the output level of the photo sensor assembly PS has the above mentioned predetermined relationship with the maximum level. In detail, the arm angles corresponding to the levels c, e, g, i and k in FIG. 4B are read and then stored in a sequence. Simultaneously, the signals applied via the transmission lines 19 from the arm control circuit AC are stored in the RAM each time the photo sensor assembly PS detects a separation band. Since these signals from the arm control circuit AC indicate the vertical and horizontal angles of the arm 1, these signals will be used to check the angle data from the arm angle encoder AE and to control the stylus pressure as will be described hereinlater.

In addition, the signals indicative of the rotational angles of the turntable T, applied from the motor control circuit MC via the transmission lines 21 are stored in the RAM in the same manner whenever a separation band is detected.

In the following step 80, programmed information as to the pieces of music is read out. Let us suppose that the third piece of music on the disk record D has been selected by the keyboard KB and programmed in the RAM. The third piece of music is designated as "h" in FIG. 4B. The arm 1 is located at this time at the most inner portion of the turntable T since the arm has just finished the above mentioned scanning. Then the arm 1 is horizontally rotated toward the periphery of the turntable T while the angle of the arm 1 is detected continuously by checking the coded output signal of the arm angle encoder AE.

In order to place the stylus tip on the third separation band, which is designated as "g" in FIG. 4B and is located just before the third piece "h", the arm angle represented by the output signal of the arm angle encoder AE has to be compared with a prestored arm angle corresponding to the third separation band "g". However, it is to be noted that the arm angles represented by the prestored signals, which can be read out from the RAM, do not exactly incidate the right angle of the arm, the stylus S of which is above or on one of the separation bands, since these angles have been detected on the above mentioned scanning each time the photo sensor assembly PS has detected a separation band. Namely, because of the distance between the stylus tip and the reflecting point PSa of the photo sensor assembly PS the arm angle detected on detection of a separation band is always smaller than the arm angle which will be made when the stylus tip is on the separation band. Accordingly, the angle indicated by the arm angle encoder AE cannot be simply compared with the angle prestored.

Here, the output signal of the stylus position correction circuit PC of FIG. 1 will be used in the central control unit CU to modify the angle indicated by the output signal of the arm angle encoder AE. The output signal of the stylus position correction circuit PC represents the horizontal distance L between the stylus tip and the reflecting point PSa (see FIG. 3 and FIG. 5) measured along the radius of the turntable T. Since the distance L is substantially constant as proved hereinabove, the angle between line 2a Sa and the line 2a PSa in FIG. 5 is also substantially constant. Therefore, the arm angle obtained after scanning can be modified by a predetermined angle corresponding to the constant length of L. In order to modify the arm angle the above mentioned predetermined angle will be added to the actually measured angle from the arm angle encoder AE. The modified angle will be compared with a read out angle of the third separation band.

The arm 1 is rotated in the same direction, until the modified angle equals the read out angle from the RAM. When these two angles match with each other, the energization of the horizontal position control motor HM is stopped and thus horizontal movement of the arm 1 terminates. Then the vertical position control motor VM is driven in opposite direction to lower the arm 1.

From the above, it will be understood that the distance L between the stylus tip and the reflecting point PSa of the photo sensor assembly PS is electrically compensated for. The output voltage of the stylus position correction circuit PC may be manually changed by manipulating the movable contact of the aforementioned potentiometer so that the output voltage can follow the actual distance if the distance deviates from an originally set standard distance.

Although in this embodiment, the output signal of the arm angle encoder AE is modified by the above mentioned output signal of the stylus position correction circuit before the arm angle is compared with the read out angle from the RAM, the arm angles obtained on scanning may be modified in the same manner prior to storing the same into the RAM in place of modifying an arm angle to be compared with the read out arm angle.

The lowering speed of the arm 1 toward the disk surface is controlled such that the stylus S is correctly placed on a right position in the third separation band even if the separation bands and the sound grooves take a form of eccentric circles with respect to the center of the disk D. To this end the rotational angle of the turntable T which has been prestored in the RAM will be arm control circuit AC with a command to reduce the driving current to the vertical position control motor VM. The amount of the driving current is adjusted to be constant in accordance with the output signal of the amplifier AMP so that the stylus pressure is maintained constant as long as the stylus S traces the sound groove. The stylus pressure may be readily adjusted by the stylus pressure adjusting circuit PA as described hereinbefore, and the adjusted pressure will be displayed at the display DP so that the user of the record player is able to visually ascertain the same. The display DP also displays the number of the piece of music on play, the number of piece of music to be played next as well as the number of pieces of music programmed but not yet played back.

The horizontal angle of the arm 1 indicated by the output signal of the arm angle encoder AE is compared with a prestored angle of the same corresponding to the separation band, i.e. "g" in FIG. 4B, which follows the sound groove portion, i.e. "h" in FIG. 4B, for ascertaining that the playback of the third piece "h" is finished and the stylus S has reached the following separation band "i". When these angles equal each other or when the former angle exceeds the latter angle, the arm 1 is raised. On the other hand, if these two angles have not yet been equal to each other, the comparison of the angles will be repeated, while the display of the stylus pressure takes place. The comparison of these horizontal angles of the arm 1 is made only when the turntable T assumes a predetermined rotational angle at which the horizontal angle of the arm 1 has been detected on programming and scanning so that variation or error due to the aforementioned eccentricity is prevented.

In a following step 100, it is detected whether there are any programed pieces of music which have not yet been played back. If any, the answer of the step 100 is YES and the program sequence returns to the step 80 so that the remaining pieces of music will be played back. After all of the programmed pieces of music have been played back, the answer of the step 100 becomes NO, so that the operational sequence enters into the step 30, rasing the arm 1 to return the same to the arm rest.

Figure 6:
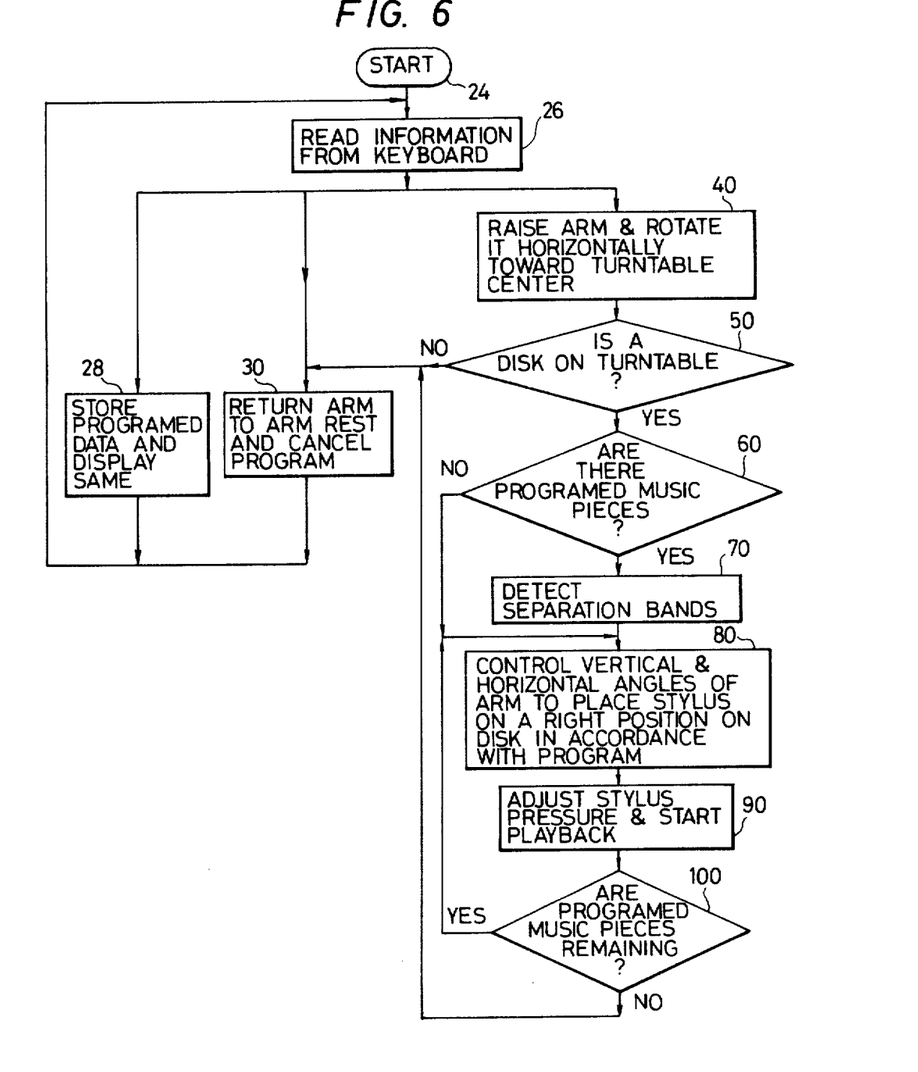
FIG. 6 is a flow chart showing the operation of the central control unit shown in FIG. 1.
Figure 7:
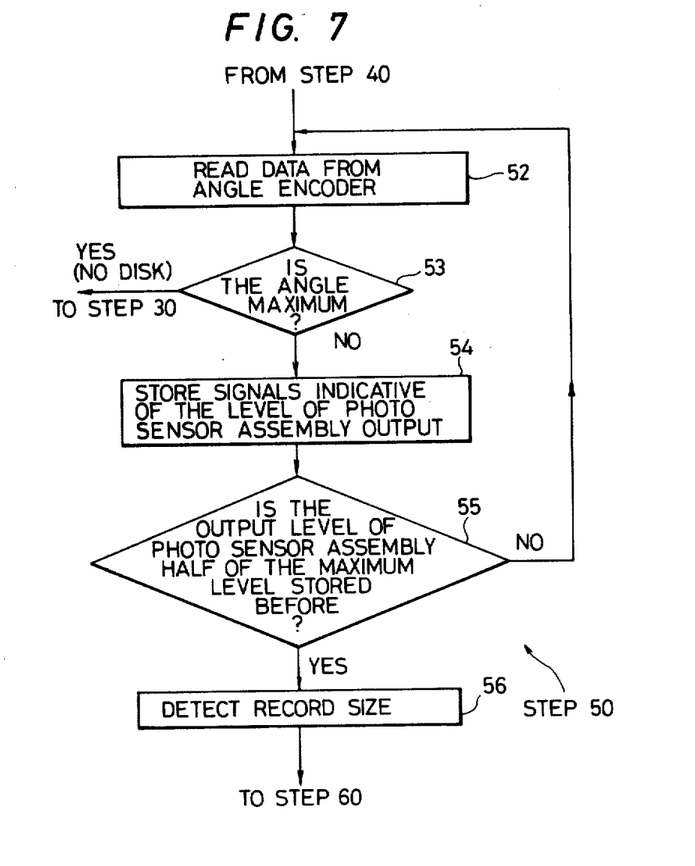
FIG. 7 is a detailed flow chart of the step 50 shown in the flow chart of FIG. 6.

Although it has been described that the programmed information as to the preselected pieces of music will be cancelled in the step 30, the flow chart of FIG. 6 may be changed in such a manner that the programed data are not cancelled when directed to repeat the automatic playback of all of the programmed pieces of music. In order to repeat the playback the same programmed pieces a specific signal indicative of the end of the reproduction of all of the programmed pieces may be produced when the last piece of music has been reproduced. This specific signal may be used to start such a repetition. Furthermore, when more than two programmable automatic record players are used, the above mentioned specific signal emitted from the first record player may be applied to the second record player for starting the operation of the central control unit CU of the second player so that pieces of music preprogrammed in the RAM of the central control unit CU of the second player will be played back following the reproduction of the pieces of music in the first player. This means that different pieces of music respectively recorded on two different phonograph disks may be successively played back so that the listener does not have to wait till changing the record disks.

The muting switch MS is used as described in the above for effectively cutting off noises picked up on abutment of the stylus S against the disk surface. The muting switch MS may be turned on by detecting the lowering speed of the arm 1. In detail, the lowering speed of the arm 1 is detected by detecting the variation in driving current fed to the vertical position control motor VM, and a voltage proportional to the lowering speed is produced. This voltage will be compared with a predetermined voltage in a comparator to produce an output signal when the voltage falls below the predetermined voltage. A suitable time measuring means, such as a monostable multivibrator, is triggered by the output signal of the comparator so that the monostable multivibrator output inverts after a given interval. The muting switch MS is arranged to turn on in response to the inversion of the monostable multivibrator output signal.

With this arrangement noises picked up by the pickup 7 during placement of the stylus S will be cut off, and since the muting switch MS turns on a short period after the placement of the stylus S, the prerecorded information such as a piece of music will be reproduced from the very beginning.

In the above described embodiment, it has been described that the output signal of the photo sensor assembly PS is detected by comparing the level of the output signal with a threshold. However, it is possible to detect the separation bands more accurately by detecting various factors of the output voltage of the photo sensor assembly PS. For instance, the sharpness of the rising voltage, the peak value, the difference between the base line voltage and the peak value, the ratio of the peak value to the base line voltage or the like may be detected in order to more accurately and precisely detect the separation bands.

From the foregoing, it will be understood that the size of the phonograph disk D, the positions of the separation bands on the disk D are detected as functions of the horizontal angles of the pickup arm 1, and such information is stored in the memory, i.e. the RAM, when scanning the surface of the disk by the photo sensor assembly PS. Simultaneously, vertical and horizontal angles of the arm 1, which are indicated by the driving currents of the vertical position control motor VM and the horizontal position control motor HM, as well as the rotational angle of the turntable T are stored in the RAM. The horizontal angle represented by the driving current of the horizontal position control motor HM will be used to check the horizontal angle indicated by the arm angle encoder AE. The vertical angle represented by the driving current of the vertical position control motor VM will be used not only to see the vertical angle of the arm 1 but also to control the stylus pressure. The rotational angle of the turntable T will be used to correctly place the stylus on a desired position without being influenced by the eccentricity of the disk D.

When the pickup 7 is replaced with another, the stylus position correction circuit PC may be manipulated to produce an output signal indicative of the horizontal distance between the stylus tip and the reflecting point PSa of the photo sensor assembly PS so that the arm angle represented by the output signal of the arm angle encoder AE can be always correctly modified.

What is claimed is:

1. A programmable automatic record player comprising:
   (a) a turntable arranged to be rotated by a turntable drive motor;
   (b) a tonearm equipped with a pickup having a stylus, a vertical position control motor and a horizontal position control motor for controlling vertical and horizontal angular displacement of said tonearm;
   (c) a photo sensor assembly mechanically connected to said tonearm for sensing non-recorded portions on a phonograph disk placed on said turntable, said photo sensor assembly being positioned so that the point sensed thereby is slightly closer to the center of said turntable than is the tip of said stylus, and the locus of said sensed point substantially coincides with the locus of said stylus tip when said tonearm is moved horizontally, said photosensor assembly having an output signal;
   (d) first means for detecting the horizontal angular displacement of said tonearm;

(e) second means for modifying the detected horizontal angular displacement by a predetermined angle corresponding to a predetermined distance between said sensed point and the tip of said stylus;

(f) third means for storing an output signal of said first means in response to the output signal of said photosensor assembly so that angle information data from said first means corresponding to said non-recorded portions are respectively stored;

(g) fourth means for selecting a datum prestored in said third means;

(h) fifth means for comparing the output signal of said second means with a selected datum from said fourth means, said fifth means having an output signal;

(i) sixth means for storing data related to programming of playback of recorded portions of the phonograph disk said data being read out for controlling of said fourth means;

(j) seventh means for producing driving currents respectively applied to said vertical position control motor and to said horizontal position control motor, said seventh means controlling said tonearm in response to the output signal of said fifth means;

(k) eighth means for controlling said seventh means so that said photosensor assembly scans the surface of said phonograph disk prior to programmably playing back the recorded portions of the phonograph disk, said eighth means reading said data from said sixth means for further controlling said seventh means so that said recorded portions of the phonograph disk are played back in the programmed sequence; and (l) ninth means for manually changing said predetermined angle corresponding to the predetermined distance when the actual distance between said sensed point and the tip of said stylus differs from said predetermined distance.

2. A programmable automatic record player as claimed in claim 1, wherein said photosensor assembly is located at one side of said pickup so that said photosensor assembly is closer to the center of said turntable than is the tip of said stylus.

3. A programmable automatic record player as claimed in claim 1, further comprising a keyboard for programming said data relating to pieces of information to be played back so that said data are stored in said fifth means.

4. A programmable automatic record player comprising:

(a) a turntable arranged to be rotated by a turntable drive motor;

(b) a tonearm equipped with a pickup having a stylus, a vertical position control motor and a horizontal position control motor for controlling vertical and horizontal angular displacement of said tonearm;

(c) a photosensor assembly mechanically connected to said tonearm for sensing non-recorded portions on a phonograph disk placed on said turntable, said photosensor assembly being positioned so that the point sensed thereby is slightly closer to the center of said turntable than is the tip of said stylus, and the locus of said sensed point substantially coincides with the locus of said stylus tip when said tonearm is moved horizontally, said photosensor assembly having an output signal;

(d) first means for detecting the horizontal angular displacement of said tonearm;

(e) second means for modifying the detected horizontal angular displacement by a predetermined angle corresponding to a predetermined distance between said sensed point and the tip of said stylus;

(f) third means for storing an output signal of said second means in response to the output signal of said photosensor assembly so that angle information data from said second means corresponding to said non-recorded portions are respectively stored;

(g) fourth means for selecting a datum prestored in said third means;

(h) fifth means for comparing the output signal of said first means with the selected datum from said fourth means, said fifth means having an output signal;

(i) sixth means for storing data related to programming of playback of recorded portions of the phonograph disk, said data being read out for controlling said fourth means;

(j) seventh means for producing driving currents respectively applied to said vertical position control motor and to said horizontal position control motor, said seventh means controlling said tonearm in response to the output signal of said fifth means;

(k) eighth means for controlling said seventh means so that said photosensor assembly scans the surface of said phonograph disk prior to programmably playing back the phonograph disk, said eighth means reading said data from said sixth means for further controlling said seventh means so that said recorded portions of the phonograph disk are played back in the programmed sequence; and (l) ninth means for manually changing said predetermined angle corresponding to the predetermined distance when the actual distance between said sensed point and the tip of said stylus differs from said predetermined distance.

5. A programmable automatic record player as claimed in claim 1 or 4, wherein said photo sensor assembly comprises a casing, a light source for emitting a light beam downwardly, a photo sensitive element for receiving a reflecting beam, and means for preventing direct transmission of the light beam from said light source to said photo sensitive element.

6. A programmable automatic record player as claimed in claim 4, further comprising a display for visually indicating said data relating to programmed pieces of information.

7. A programmable automatic record player as claimed in claim 4, wherein said first means comprises a member fixedly connected to a rotary shaft of said arm for producing a coded signal in accordance with the rotational angle of said arm.

8. A programmable automatic record player as claimed in claim 7, wherein said member is a plate substantially perpendicular to said shaft, a plurality of through-holes being made in said plate and being aligned in a plurality of rows which are radially arranged with respect to the axis of the rotation of said shaft, said plate being interposed between a series of light sources and a series of light sensitive elements.

9. A programmable automatic record player as claimed in claim 1 or 4, wherein said second means comprises a potentiometer connected across a predetermined voltage source, said potentiometer having a movable contact the position of which is manually adjustable.

10. A programmable automatic record player as claimed in claim 1 or 4, wherein said third means comprises a RAM of a computer.

11. A programmable automatic record player as claimed in claim 1 or 4, wherein the reflection coefficient of said turntable is made higher than that of said non-recorded portions of said phonograph disk.

12. A programmable automatic record player as claimed in claim 1 or 4, wherein said fifth means comprises a RAM of a computer.

13. A programmable automatic record player as claimed in claim 1 or 4, wherein said seventh means comprises a microcomputer.

14. A programmable automatic record player as claimed in claim 1 or 4, further comprising means for detecting the increase and decrease in each of said driving currents of said vertical position control motor and said horizontal position control motor.

15. A programmable automatic record player as claimed in claims 1 or 4, further comprising tenth means for detecting the rotational angle of said turntable, the detected rotational angle of said turntable being used for controlling said sixth means so that said stylus is accurately placed on a desired position on the phonograph disk irrespective of any eccentricity of the phonograph disk.

16. A programmable automatic record player as claimed in claim 15, further comprising means for controlling the lowering speed of said arm in view of the rotational angle of said turntable.

17. A programmable automatic record player as claimed in claim 1 or 4, further comprising means for adjusting the stylus pressure, the stylus pressure adjusting means being connected to said vertical position control motor to supply the same with a constant driving current as long as said stylus is on the surface of said disk.

18. A programmable automatic record player as claimed in claim 17, wherein said stylus adjusting means comprises a potentiometer connected across a predetermined voltage source, and an amplifier.

19. A programmable automatic record player as claimed in claim 1 or 4, further comprising a muting switch for blocking the output signal or signals of said pickup on placement of said stylus onto said phonograph disk.

20. A programmable automatic record player as claimed in claim 19, further comprising means for detecting the increase in said driving current of said vertical position control motor and means for measuring a given interval from an instant that said driving current exceeds a predetermined value, said muting switch being turned off before said stylus abuts on the surface of said phonograph disk, and then being turned on in response to the output signal of said given interval measuring means.

* * * * *